(12) United States Patent
Shyu et al.

(10) Patent No.: US 7,379,570 B2
(45) Date of Patent: May 27, 2008

(54) OPTICAL ENGINE FOR FINGERPRINT READER

(75) Inventors: San-Wuei Shyu, Taipei (TW); Ting-Kou Hua, Taipei (TW)

(73) Assignee: E-Pin International Tech Co., Ltd., Taipei (TW)

( * ) Notice: Subject to any disclaimer, the term of this patent is extended or adjusted under 35 U.S.C. 154(b) by 634 days.

(21) Appl. No.: 11/037,205

(22) Filed: Jan. 19, 2005

(65) Prior Publication Data

US 2006/0159317 A1 Jul. 20, 2006

(51) Int. Cl.
*G06K 9/00* (2006.01)
*G06K 9/74* (2006.01)

(52) U.S. Cl. ............... 382/124; 356/71; 713/186; 340/5.53; 340/5.83

(58) Field of Classification Search ........ 382/115–127; 283/68, 69, 78; 340/5.1, 5.2, 5.52, 5.53, 340/5.8–5.86; 902/3; 356/71; 713/186
See application file for complete search history.

(56) References Cited

U.S. PATENT DOCUMENTS

| | | | | |
|---|---|---|---|---|
| 3,716,301 A * | 2/1973 | Caulfield et al. | ............ | 356/394 |
| 4,120,585 A * | 10/1978 | DePalma et al. | ............. | 356/71 |
| 4,924,085 A * | 5/1990 | Kato et al. | ............. | 250/227.28 |
| 4,925,300 A * | 5/1990 | Rachlin | ........................ | 356/71 |
| 5,625,448 A * | 4/1997 | Ranalli et al. | ................. | 356/71 |
| 5,650,842 A * | 7/1997 | Maase et al. | .................. | 356/71 |
| 6,069,969 A * | 5/2000 | Keagy et al. | ................ | 382/124 |
| 6,127,674 A * | 10/2000 | Shinzaki et al. | ........ | 250/227.28 |
| 6,154,285 A * | 11/2000 | Teng et al. | .................. | 356/445 |
| 6,750,955 B1* | 6/2004 | Feng | ............................ | 356/71 |
| 6,954,261 B2* | 10/2005 | McClurg | ...................... | 356/71 |
| 6,956,608 B1* | 10/2005 | Shapiro et al. | ............. | 348/335 |
| 7,119,890 B2* | 10/2006 | McClurg | ...................... | 356/71 |
| 7,148,466 B2* | 12/2006 | Eckman et al. | ............. | 250/221 |
| 7,212,279 B1* | 5/2007 | Feng | ............................ | 356/71 |
| 2005/0205667 A1* | 9/2005 | Rowe | .......................... | 235/382 |
| 2006/0028635 A1* | 2/2006 | McClurg | ...................... | 356/71 |
| 2006/0110015 A1* | 5/2006 | Rowe | .......................... | 382/124 |
| 2006/0159317 A1* | 7/2006 | Shyu et al. | ................. | 382/127 |

* cited by examiner

*Primary Examiner*—Aaron W. Carter
(74) *Attorney, Agent, or Firm*—Lowe Hauptman Ham & Berner, LLC

(57) ABSTRACT

An optical engine for fingerprint reader with a one-piece optical prism has double functions of prism and lens for replacing optical engines of traditional fingerprint readers that consists of a right-angle prism and a lens. Thus the volume of the device is minimized for the convenience of being modularized Moreover, there is a complete light path between the fingerprint and the sensing device so as to increase the signal to noise ratio (S/N) and the reliability as well as the stability of the optical engine. Furthermore, a LED light source is disposed around an optical prism while an arched concave with diameter of 120 mm for being pressed by finger is formed with ergonomically design so as to have more clear image of fingerprint.

6 Claims, 5 Drawing Sheets

OPTICAL ENGINE FOR FINGERPRINT READER

BACKGROUND OF THE INVENTION

The present invention relates to an optical engine for fingerprint reader, especially an integrated optical prism with double functions of prism and lens for replacing optical engines of traditional fingerprint readers that consists of a right-angle prism and a lens. The present invention simplifies the assembling of components and increases the stability and reliability of the optical engine.

The optical engines for fingerprint readers available on the market are based on various materials such as optical fibers, capacities, or traditional types. However, except traditional types, others need higher cost. Thus traditional-type optical engine is still the main stream of market. Refer to FIG. 1, a traditional optical engine 10 is composed by a right-angle prism 11 and a lens 12. The position for finger F 13 is on the inclined optical surface of the right-angle prism 11 while a LED (light emitting diode) light source 14 is disposed on one of the optical surfaces 15 of the right-angle prism 11 (such as horizontal plane shown in figure). By Snell's law, the light emitted from the LED light source 14 is totally reflected on the position for finger F 13 so that the black and white stripes of the fingerprint is projected from another optical surface 16 (the vertical plane shown in figure), finally through a lens 12 forms an image on a sensing device 17. But the optical engine 10 with two-piece structure has following disadvantages:

(1) The structure of assembling of two components has larger volume, thus is difficult to get popular support.
(2) In the two-component structure, the right-angle prism 11 and the lens 12 shall be localized precisely so as to make the light path straight. Not only the number of components causes the problem, but the difficulty of assembling is also increased. Thus the cost is high.
(3) The prism 11 is a right angle prism so that an image of the LED light source 14 also forms on the sensing device 17. This leads to the low S/N ratio that has bad effect on efficiency of the device.
(4) The position for putting finger F 13 is a flat plane so that users need to press in order to get the clear fingerprint image. This causes a bit inconvenience.

SUMMARY OF THE INVENTION

It is therefore a primary object of the present invention to provide an optical engine for fingerprint reader that uses an integrated one-piece optical prism with double functions of prism and lens so as to replace traditional optical engines composed by a right-angle prism and a lens. The present invention avoids the shortcomings of conventional two-piece engine and has simplified assembling way. Thus inaccuracy during processing is reduced, and the stability and reliability of the optical engine is improved.

It is another object of the present invention to provide an optical engine for fingerprint reader having an integrated one-piece optical prism that is improved from a conventional right-angle prism. The angle for the position for putting finger is 130 degrees (the angle in conventional right-angle prism is 90 degrees). The image of fingerprint goes through two times of total internal reflection and then enters the lens of the optical prism. There is a complete light path between the fingerprint and the sensing device thus the signal to noise ratio (S/N) is increased.

It is another object of the present invention to provide an optical engine for fingerprint reader that includes a LED light source disposed around an optical prism while an arched concave with diameter of 120 mm for being pressed by finger is formed with ergonomically design so as to have more clear image of fingerprint.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 2:
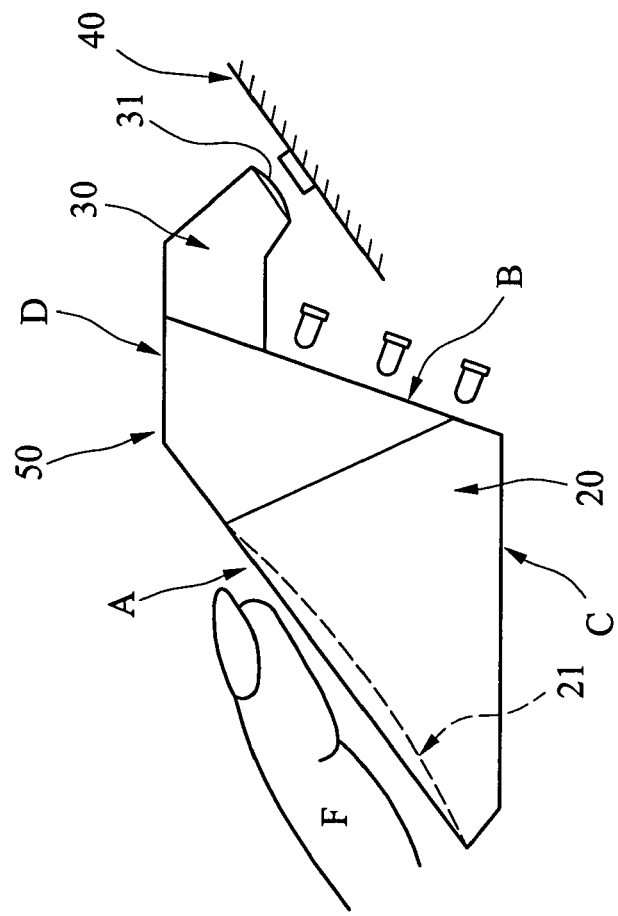
FIG. 2 is a schematic drawing showing side view of the present invention.
Figure 1:
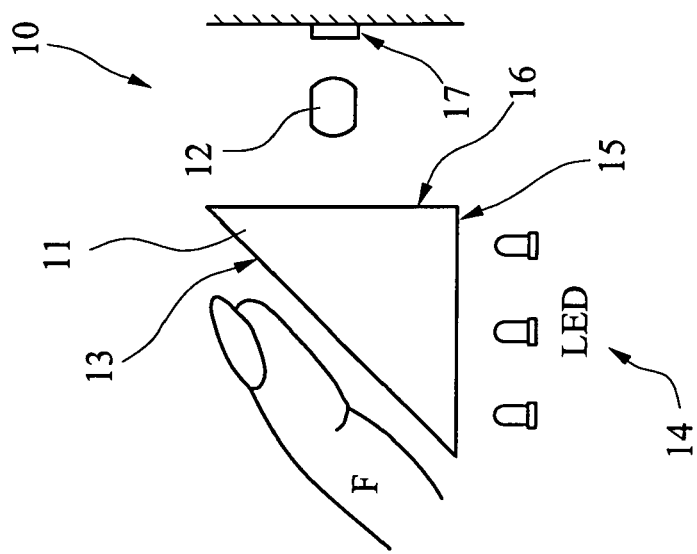
FIG. 1 is a schematic drawing showing side view of a traditional optical fingerprint reader.
Figure 4:
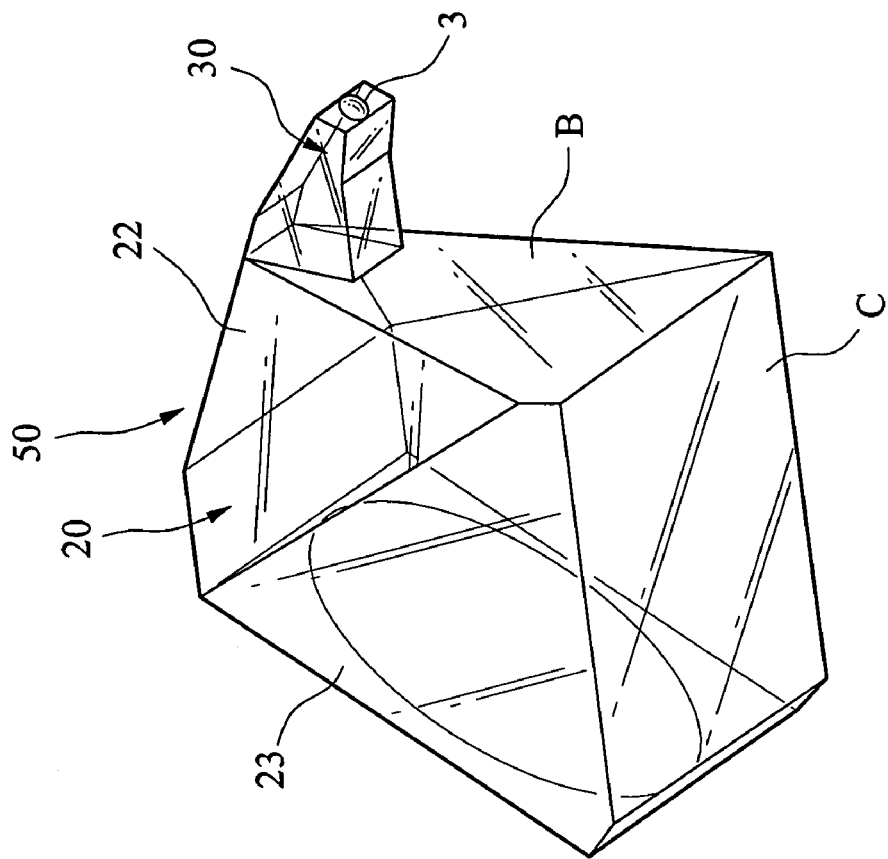
FIG. 4 is a perspective view of the embodiment in FIG. 3 from another angle.
Figure 3:
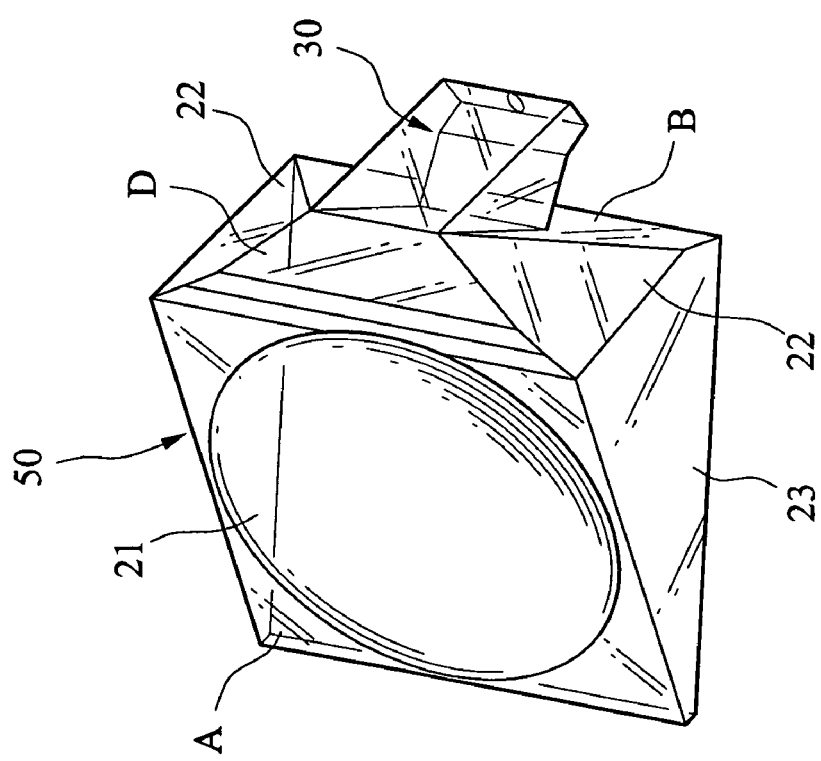
FIG. 3 is a perspective view of an optical prism in accordance with the present invention.
Figures 5, 6:
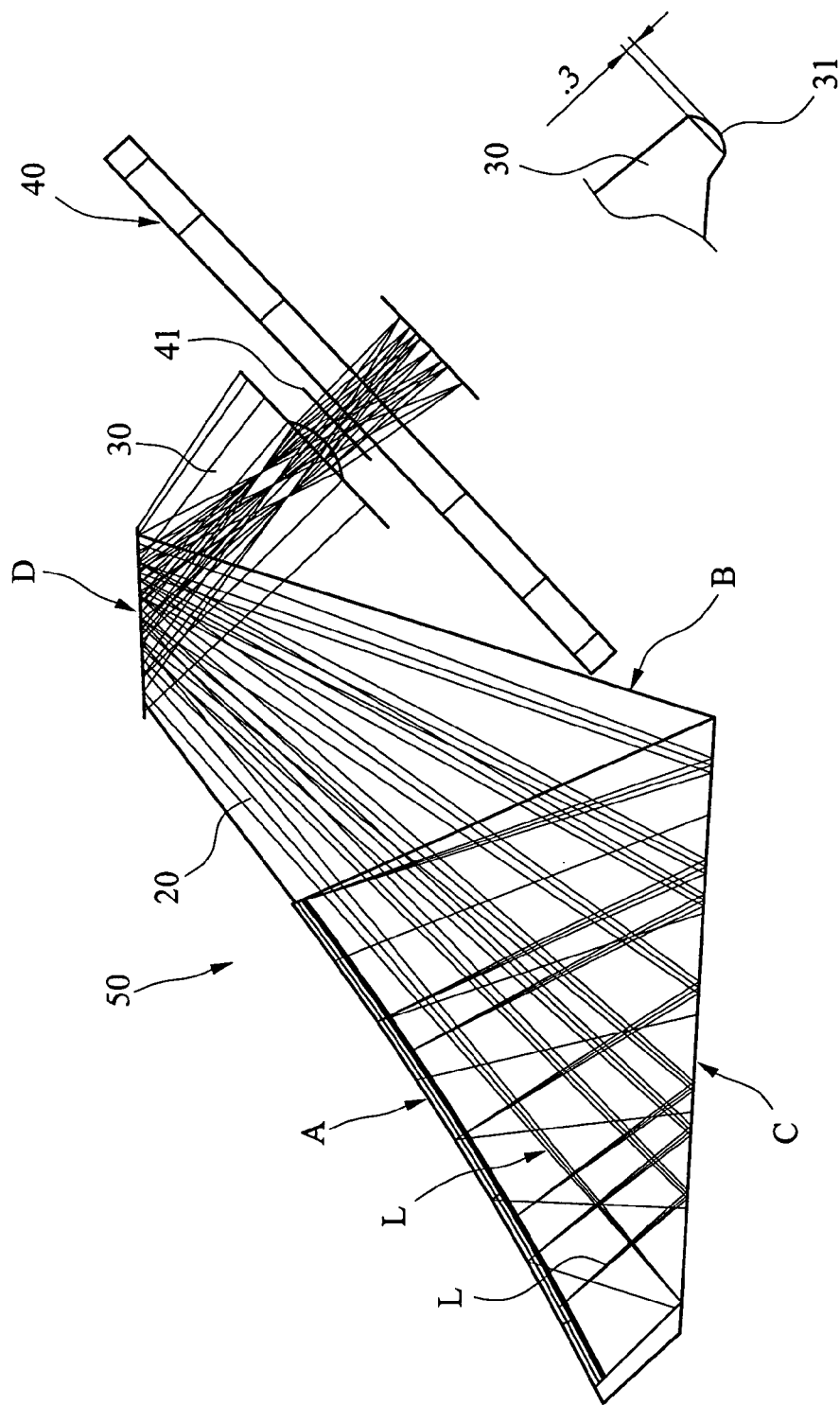
FIG. 5 is a schematic drawing of light path in an optical engine in accordance with the present invention.
FIG. 6 is a schematic drawing of the lens in accordance with the present invention (with reference size)

Refer to FIG. 2, FIG. 3 & FIG. 4, an optical engine in accordance with the present invention includes a prism 20, a lens 30, and a sensing device 40. The present invention features on that: the prism 20 and the lens 30 are integrated into one piece of an optical prism 50 so that the optical prism 50 has the total internal reflection of the prism 20 as well as the image displaying function of the lens 30, as shown in FIG. 1. The one-piece optical prism 50 includes the prism 20 and the lens 30. The prism 20 is a prism with light path moving to and fro and having an optical surface A for being pressed by a finger F, an optical surface B facing a LED light source, a first total-reflective optical surface C and a second total-reflective optical surface D, four optical surfaces. The angle between the optical surface B and the first total-reflective optical surface C is about 130°, replacing conventional 90 degrees angle of the right angle prism 11 shown in FIG. 1. And the angle facing upwards between the optical surface A and the optical surface B is an acute angle (less than 90 degrees) so as to form the second total-reflective optical surface D with smaller width. While the lens 30 is disposed on the position extended from the second total-reflective optical surface D and the optical surface B and a non-sphere 31 is on the tail part of the lens 30, as shown in FIG. 6. p The non-sphere 31 faces a receiving plane 41 of a sensing device 40. The sensing device 40 is a device for receiving and processing images such as CMOS or CCD.

According to the design of the prism 20, the image of fingerprint passes the first total-reflective optical surface C and the second total-reflective optical surface D, after two times of total reflection, thought the lens 30 forms an image. By this way, the signal to noise ratio (S/N) is increased effectively. On the optical surface A for being pressed by finger F, an arched concave 21 with diameter of 120 mm is formed with ergonomically design and more clear image of fingerprint.

In usage, as shown in FIG. 5, light from the LED light source disposed outside the optical surface B is refracted and entered the optical prism 50, then lighting the fingerprint of the finger F pressed on the arched concave 21 of the optical surface A. The light of fingerprint image L moves toward the first total-reflective optical surface C inside the optical prism 50, and is reflected by the first total-reflective optical surface C, then moves toward the second total-reflective optical surface D. After a second total reflection by the second total-reflective optical surface D, the light enters the lens 30 and moves toward the non-sphere 31 on the tail part of the lens 30. Then forms an image on the non-sphere 31 that is processed by the sensing device 40.

Figure 7A:
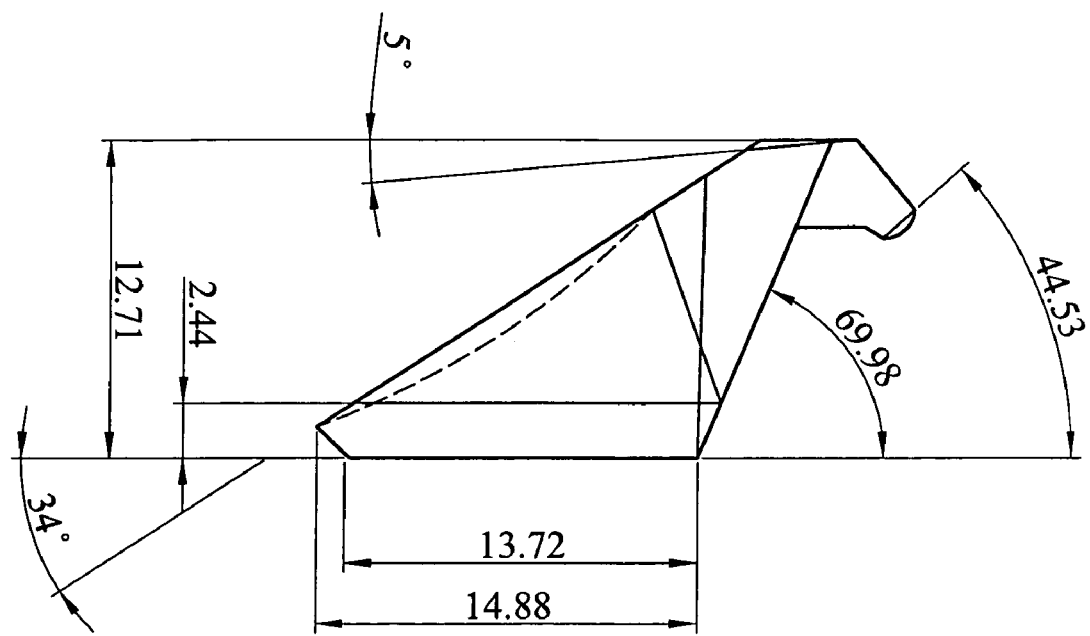
FIGS. 7A, 7B, 7C are schematic drawing of the three surfaces (with reference size) of an optical prism in accordance with the present invention.
Figure 7B:
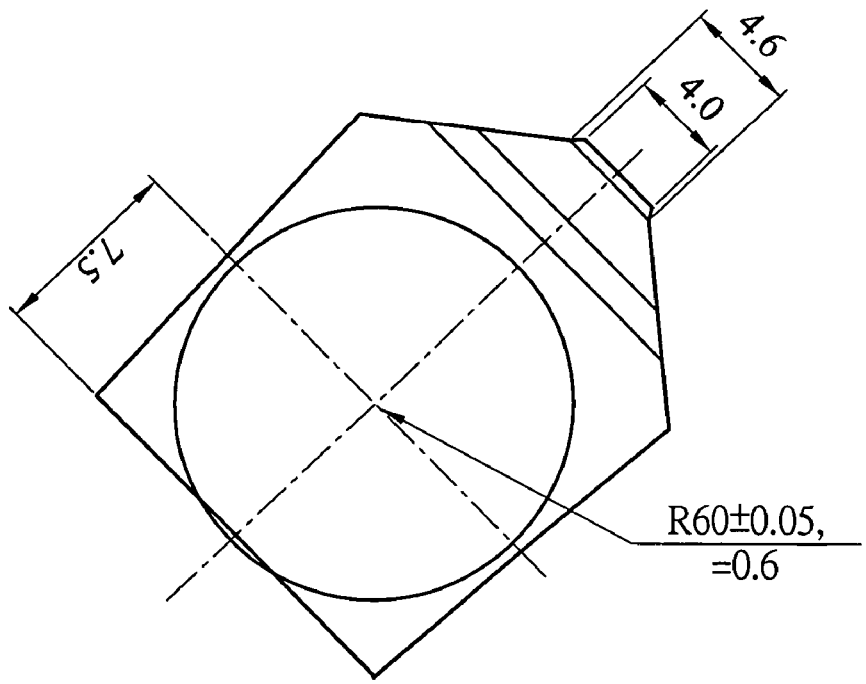
Figure 7C:
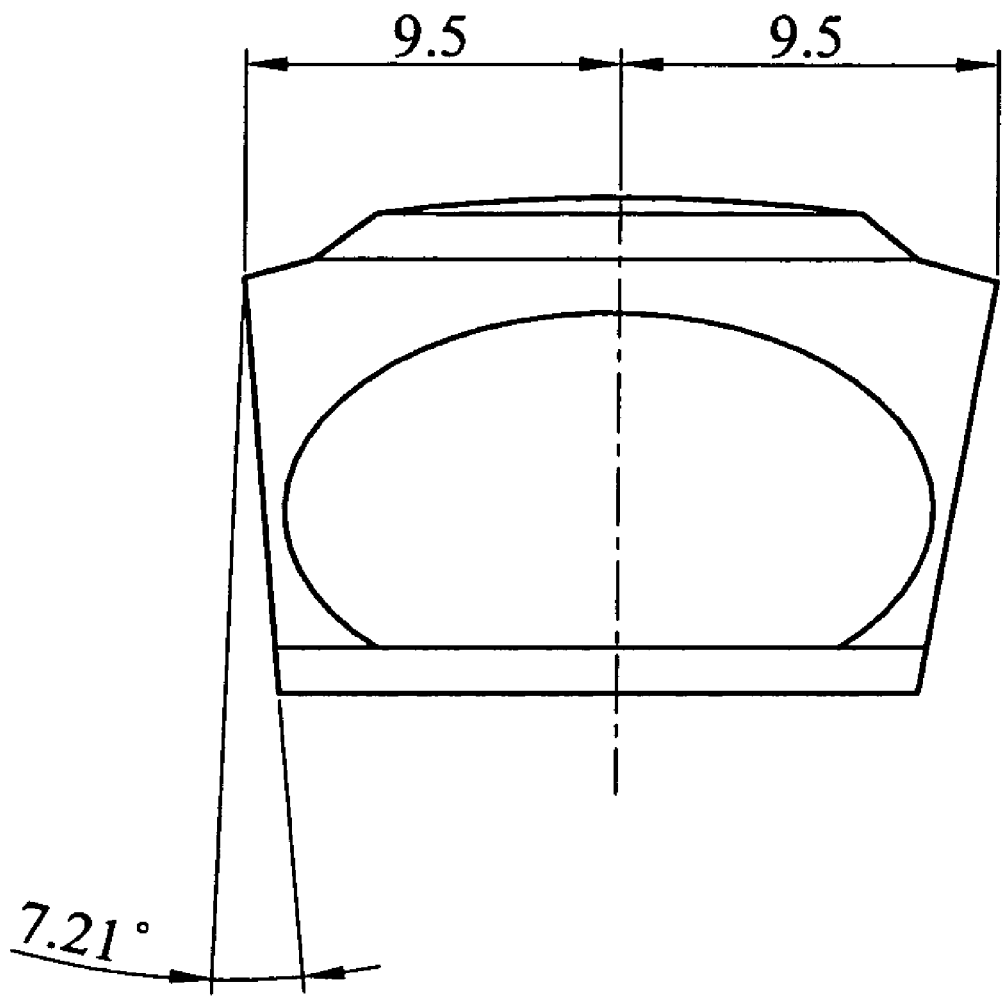

Moreover, refer to FIG. 7A, FIG. 7B, and FIG. 7C, an embodiment of the optical prism 50 in accordance with the present invention is disclosed. Due to one-piece design of the optical prism 50, the optical engine of the fingerprint reader according to the present invention is with light-weight and compact design. For example, the size of an embodiment is under 14.5 mm (H)×44 mm (L)×26 mm (W) for the convenience of being modularized. Thus it is easy to be assembled on various products that include an USB socket thereof. Secondly, each one of several surfaces on the optical prism 50 can be a locating surface for easy assembling. And the one-piece optical prism 50 provides a complete optical path thus can be used in combination with CMOS sensing device 40 so as to form a reliable optical engine module with excellent quality.

Furthermore, the function of Total Internal Reflection (TIR) of the first total-reflective optical surface C and the second total-reflective optical surface D can also be achieved by design of various material or angles between optical surfaces of the optical prism 50. Or a layer of reflective membrane (such as aluminum) is directly plated on the first total-reflective optical surface C and the second total-reflective optical surface D so as to make the optical prism 50 have the Total Internal Reflection function.

In addition, in accordance with the design of the prism 20 in the optical prism 50, the LED light source is arranged either outside the optical surface B or arranged on other surface of the optical prism 50, such as prism surfaces 22, 23 shown in FIG. 3 & FIG. 4 so as to achieve best lighting efficiency.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical engine for fingerprint readers comprising a one-piece optical prism having a prism and a lens integrated with each other, and a sensing device;

wherein the prism of the optical prism having an optical surface A for being pressed by a finger F, an optical surface B facing a LED light source, a first total-reflective optical surface C and a second total-reflective optical surface D; the angle between the optical surface B and the first total-reflective optical surface C is about 130° and the angle facing upwards between the optical surface A and the optical surface B is an acute angle so as to form the second total-reflective optical surface D with smaller width; while the lens of the optical prism is disposed on the position extended from the second total-reflective optical surface D and the optical surface B and a non-sphere is formed on the tail part of the lens, facing a receiving plane of the sensing device; in usage, light from the LED light source is refracted through the optical surface B and entered the optical prism, then lighting the fingerprint of the finger F pressed on the arched concave of the optical surface A while the light from fingerprint image moves toward the first total-reflective optical surface C inside the optical prism, and is reflected by the first total-reflective optical surface C, then moves toward the second total-reflective optical surface D and through a second total reflection by the second total-reflective optical surface D, then the light enters the lens and moves toward the non-sphere on the tail part of the lens and forms an image by the non-sphere and the lens; then the image is processed by the sensing device.

2. The optical engine for fingerprint readers as claimed in claim 1, wherein an arched concave with diameter of 120 mm is formed with ergonomically design on the optical surface A for being pressed by finger.

3. The optical engine for fingerprint readers as claimed in claim 1, wherein the first total-reflective optical surface C is a surface being plated with a membrane.

4. The optical engine for fingerprint readers as claimed in claim 1, wherein the second total-reflective optical surface D is a surface being plated with a membrane.

5. The optical engine for fingerprint readers as claimed in claim 1, wherein the LED light source disposed around the surfaces on the optical prism.

6. The optical engine for fingerprint readers as claimed in claim 1, wherein the sensing device is a CMOS sensor.

* * * * *